United States Patent [19]

Tamazaki et al.

[11] Patent Number: 5,089,344
[45] Date of Patent: Feb. 18, 1992

[54] MAGNETIC RECORDING MEDIUM

[75] Inventors: Kazunori Tamazaki, Saku; Hitoshi Azegami, Tobu; Kazuhiro Kuroda, Karuizawa, all of Japan

[73] Assignee: TDK Corporation, Japan

[21] Appl. No.: 386,980

[22] Filed: Jul. 31, 1989

[30] Foreign Application Priority Data

Oct. 17, 1988 [JP] Japan .................. 63-259351

[51] Int. Cl.$^5$ ............................................. G11B 23/00
[52] U.S. Cl. ......................... 428/425.9; 428/694; 428/900
[58] Field of Search .................. 428/425.9, 694, 900

[56] References Cited

U.S. PATENT DOCUMENTS

| | | | |
|---|---|---|---|
| 4,284,750 | 8/1981 | Amirsakis | 428/425.9 |
| 4,286,022 | 8/1981 | Vermillion | 428/425.9 |
| 4,525,424 | 6/1985 | Bradshaw | 428/425.9 |
| 4,568,611 | 2/1986 | Amirsakis | 428/425.9 |
| 4,568,612 | 2/1986 | Lehner et al. | 428/425.9 |
| 4,711,819 | 12/1987 | Hanai et al. | 428/425.9 |
| 4,788,103 | 11/1988 | Okita et al. | 428/425.9 |
| 4,869,965 | 9/1989 | Gerum et al. | 428/425.9 |

Primary Examiner—Paul J. Thibodeau
Attorney, Agent, or Firm—Wood, Phillips, Mason, Recktenwald & VanSanten

[57] ABSTRACT

A magnetic recording medium whose magnetic layer formed on a base comprises a magnetic powder and a binder which contains a tertiary amine and uses 1,4-cyclohexanedimethanol as a chain extender. The magnetic powder is preferably of $CrO_2$. The medium is made by mixing and dispersing the magnetic powder in a binder which consists of a reaction product of (A) a polyester which is a reaction product of a diol selected from among ethylene glycol, propylene glycol, 1,3-butanediol, 1,4-butanediol, 1,5-pentadiol, and 1,6-hexanediol, and adipic acid, (B) a chain extender consisting of 1,4-cyclohexanedimethanol, (C) an aliphatic or aromatic diisocyanate in an amount substantially equal to the combined molar amount of the polyester and the chain extender, and (D) a tertiary amine, and applying the resulting magnetic coating material to a base.

4 Claims, No Drawings

MAGNETIC RECORDING MEDIUM

BACKGROUND OF THE INVENTION

This invention relates to a magnetic recording medium and a method of manufacturing the same, and more specifically to a magnetic recording medium excellent in both electromagnetic characteristics and durability and to a method of manufacturing the same.

Polyurethane resins of the thermosetting type are in wide use as binders for magnetic recording media. Usually, a magnetic recording medium is made using a polyurethane prepolymer with excess OH and a polyisocyanate as binder ingredients, mixing and dispersing a ferromagnetic powder in the binder, causing a nonmagnetic base film to support the resulting dispersion, and finally hardening the supported dispersion with heat. The magnetic recording medium made in this way forms a very strong magnetic film and exhibits outstanding durability, electromagnetic characteristics, and other properties. On the other hand, the thermosetting character of the binder leads to short pot life; slow hardening can cause sticking of adjacent layers of the magnetic tape wound into a roll, resulting in impaired surface properties or dropouts. In view of these and other problems, there has been demand for a new binder resin comparable in performance to the thermosetting type and yet without the aid of a hardening or crosslinking agent.

As an approach to the foregoing problems, the use of a polyurethane resin as a binder component without the accompaniment of a hardener was proposed in Japanese Patent Application Publication No. 8053/1983. To sum up, the invention is characterized by the use, as a binder component, of a reaction product of (A) a polyester which is a reaction product with excess OH of a dicarboxylic acid, such as adipic acid, and a diol, such as ethylene glycol, (B) a chain extender such as 1,4-cyclohexanedimethanol, and (C) an aliphatic or aromatic diisocyanate in an amount substantially equal to the combined molar amount of the polyester and chain extender. The binder does not require a hardener in attaining excellent properties essential for a magnetic recording medium, including a strong bond between the magnetic layer and the base film, and high heat resistance and mechanical strength.

However, the polyurethane resin binder described in Patent Application Publication No. 8053/1983 has the disadvantage of being a poor dispersant to the magnetic powder, with the consequence that the resulting magnetic recording medium has unsatisfactory surface properties with reduced electromagnetic characteristics. Furthermore, the adhesion of the magnetic layer to the base film, thermal durability of the layer, and orientation of the magnetic particles are all inadequate and leave much room for improvement.

This invention, therefore, aims at the improvement of the magnetic recording medium manufactured by using as a binder component of a reaction product of (A) a polyester or polyether type reaction product of a dicarboxylic acid, such as adipic acid, and a diol, such as ethylene glycol (excluding 1,4-cyclohexanedimethanol), (B) a chain extender such as 1,4-cyclohexanedimethanol, and (C) an aliphatic or aromatic diisocyanate in an amount substantially equal to the combined molar amount of the reaction product (A) and the chain extender, dispersing a magnetic powder in the binder, and applying the dispersion to a base film, thereby improving most of the durability, heat resistance, adhesion, dispersibility, and electromagnetic characteristics of the medium.

SUMMARY OF THE INVENTION

The aim of the invention is achieved by a magnetic recording medium including a magnetic layer formed on a base film, said magnetic layer containing a magnetic powder and a binder, characterized in that the binder comprises a polyurethane resin which contains a tertiary amine and uses 1,4-cyclohexanedimethanol as a chain extender. More particularly, the aim is attained by a magnetic recording medium characterized by the use of a binder comprising a reaction product of (A) a polyester or polyether type reaction product of a diol selected from among ethylene glycol, propylene glycol, 1,3-butanediol, 1,4-butanediol, 1,5-pentadiol, and 1,6-hexanediol, and adipic acid, (B) a chain extender consisting of 1,4-cyclohexanedimethanol, (C) an aliphatic or aromatic diisocyanate in an amount substantially equal to the combined molar amount of the polyester and the chain extender, and (D) a tertiary amine.

In conformity with the invention, the dispersibility of magnetic powder is improved over that of the prior art. The magnetic particles are easier to be oriented. Better surface properties are obtained and the signal-to-noise ratio on the high frequency side increased. The magnetic layer attains higher mechanical strength and becomes more durable. Added adhesion of the magnetic powder to the base is a further advantage.

DETAILED DESCRIPTION OF THE INVENTION

The invention will be better understood from the following detailed description made in connection with examples thereof.

Our intensive study on the improvement of the reaction product of the aforementioned ingredients (A), (B), and (C) has now led to the discovery that the addition of a tertiary amine to the reaction mixture strikingly improves the properties of the reaction product as a binder.

The ingredient (A) is a polyester ingredient. It is a polyester or polyether type prepolymer commonly used in this field, such as a reaction product of adipic acid and a diol chosen from among ethylene glycol, propylene glycol, 1,3-butanediol, 1,4-butanediol, 1,5-pentadiol, and 1,6-hexanediol. This polyester is used in the form of an equivalent reaction product or with excess OH. In the latter case, the resulting end-hydroxyl group reacts with the diisocyanate (C). The case with excess OH is described in the specification of the patent application publication cited above. While the same specification mentions various dicarboxylic acids, adipic acid is preferred under the present invention.

The ingredient (B) is a chain extender, which should, above all, be 1,4-cyclohexanedimethanol. Although the cited specification refers to a variety of other chain extenders, they are little effective for the purposes of this invention.

The ingredient (C) reacts with the above two ingredients and a tertiary amine to produce a binder of exceptionally favorable properties. Examples of diisocyanates usable for this purpose are various aliphatic and aromatic diisocyanates mentioned in the cited specification. The diisocyanate chosen is used in an amount substantially equimolar with the ingredients (A) and (B) combined.

The ingredient (D), a tertiary amine, is essential for the enhancement of binder properties in accordance with the invention. Preferred examples include:

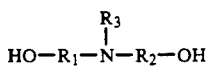

in which $R_1$ and $R_2$ are each a $C_{2-5}$ alkyl group and $R_3$ is a $C_{1-3}$ alkyl group.

The magnetic powder used in the present invention desirably consists of acicular particles whose shape anisotropy or crystal anisotropy can be taken advantage of in enhancing the magnetic orientation in the recording direction. The powder of $CrO_2$ is particularly desirable.

The invention is illustrated by the following examples.

EXAMPLES

Various polyurethane resins of the compositions shown in Table 1 were prepared. The examples of the invention to be described below used these resins selectively.

TABLE 1

| | No. av. mol. wt. Mn | Polyester (A) | Chain extender (B) | Diisocyanate (C) | Polar group (D) |
|---|---|---|---|---|---|
| Examples: | | | | | |
| Polyurethane a | 50000 | Polybutylene adipate, Polyhexamethylene adipate | 1,4-CHDM | MDI | $-(CH_2)_2-\underset{\underset{CH_3}{\mid}}{N}-(CH_2)_2-$ |
| Polyurethane b | 45000 | Polyhexyl phthalate | 1,4-CHDM | MDI | $-(CH_2)_2-\underset{\underset{CH_3}{\mid}}{N}-(CH_2)_2-$ |
| Polyurethane c | 45000 | Polyethylene adipate, Polycaprolactone | 1,4-CHDM | MDI | $-(CH_2)_3-\underset{\underset{CH_3}{\mid}}{N}-(CH_2)_3-$ |
| Comparative Examples: | | | | | |
| Polyurethane d | 45000 | Polybutylene adipate, Polyhexamethylene adipate | 1,4-CHDM | MDI | $-COOH$ |
| Polyurethane e | 50000 | Polybutylene adipate, Polyhexamethylene adipate | 1,4-CHDM | MDI | $-SO_3Na$ |
| Polyurethane f | 45000 | Polybutylene adipate, Polyhexamethylene adipate | Ethylene glycol | MDI | $-(CH_2)_2-\underset{\underset{CH_3}{\mid}}{N}-(CH_2)_2-$ |

EXAMPLE 1

A 24 μm-thick base film of polyethylene terephthalate (PET) was coated with a coating material to form a magnetic layer thereon. The coating material consisted of:

| polyurethane a | 35 parts by weight |
|---|---|
| vinyl chloride-vinyl acetate copolymer (trade-named "VAGH") | 15 parts by weight |
| lubricant (myristic acid) | 1 parts by weight |
| polyisocyanate (TDI) | 10 parts by weight |
| magnetic powder $CrO_2$ (Hc = 520 Oe) | 200 parts by weight |

These ingredients were wetted and then mixed and dispersed on a sand mill to prepare a magnetic coating material.

The material was applied to the base film, subjected to magnetic field orientation, and solvent-dried. The coating so formed was calendered for surface smoothening, held in a heat-treating oven at 60° C. for 24 hours to effect thermal curing. Thereafter, the coated film was slitted into ribbons ½ in. wide as samples.

EXAMPLE 2

Samples were obtained by the same procedure as described in Example 1 with the exception that the binder comprised:

| polyurethane a | 35 parts by weight |
|---|---|
| polyurethane g ($-SO_3Na$-containing polybutylene adipate). | 15 parts by weight |

EXAMPLE 3

Samples were obtained in the same way as in Example 1 except that

| polyurethane a | 50 parts by weight |
|---|---| alone was used as the binder.

EXAMPLE 4

The procedure of Example 1 was repeated to obtain samples, with the exception that the binder used comprised:

| polyurethane b | 35 parts by weight |
|---|---|
| polyurethane g | 15 parts by weight. |

EXAMPLE 5

Except that

| polyurethane b | 50 parts by weight |
|---|---| was used as the binder, the procedure of Example 1 was followed to obtain samples.

EXAMPLE 6

The procedure of Example 1 was followed to obtain samples, with the exception that the binder used comprised:

| polyurethane c | 35 parts by weight |
| --- | --- |
| polyurethane g | 15 parts by weight. |

EXAMPLE 7

Except for the use of

| polyurethane c | 50 parts by weight |
| --- | --- | as the binder, the procedure of Example 1 was repeated and samples were obtained.

COMPARATIVE EXAMPLE 1

As the binder a mixture of

| urethane d | 35 parts by weight |
| --- | --- |
| urethane g | 15 parts by weight | was used, and otherwise in the same manner as in Example 1, samples were made.

COMPARATIVE EXAMPLE 2

Samples were obtained in the same way as in Example 1 with the exception that

| urethane d | 50 parts by weight |
| --- | --- | was used as the binder.

COMPARATIVE EXAMPLE 3

Except that the binder used comprised

| urethane e | 35 parts by weight |
| --- | --- |
| urethane g | 15 parts by weight | the procedure of Example 1 was repeated to obtain samples.

COMPARATIVE EXAMPLE 4

As the binder, a combination of

| urethane f | 35 parts by weight |
| --- | --- |
| urethane g | 15 parts by weight | was used, and otherwise in the same way as in Example 1, samples were obtained.

The samples of magnetic recording medium thus prepared were tested to evaluate their properties as follows. The results are summarized in Table 2.

(1) Surface roughness, Ra:

The surface roughness, Ra, of each sample coating was measured by means of a tracer type surface roughness meter (marketed by Taylor-Hobson Co.).

(2) Squareness ratio

The squareness ratio of each sample was measured by a vibrating-sample magnetometer, Model VSM-3 (mfd. by Toei Kogyo Co.), with an applied magnetic field of 5000 G.

(3) Adhesion

A length of adhesive tape was affixed to each test coating under a predetermined pressure, peeled from the coating surface at an angle of 180° with respect to the latter, and the force required for the peeling was determined in conformity with the procedure set forth in the Draft Standards of ANSI for 3480, 8th Ed.

(4) Durability

Each sample tape one meter long was looped, and the loop allowed to run within a recorder setup at the velocity of 2 m/s for a total of 100,000 rounds, under the conditions of 23° C. and 55% RH. After the test run the coating was visually inspected for any trace of scratching or damaging and for peeling of the magnetic layer. The evaluated results were represented alphabetically as follows:

A = no damage of the coating
B = some damage of the coating
C = medium damage of the coating
D = serious damage of the coating In consideration of the transport and other environments to be encountered, each test medium was held at 60° C. and 80% RH for 4 weeks, and its durability evaluated likewise (post-storage durability testing).

(5) Gloss

The reflection from each sample of light incident upon its plane at an angle of 60° was measured by a glossmeter (mfd. by Tokyo Denshoku Co.). The measured value was given in percent on the basis of a standard reflector value as 93%.

(6) Electromagnetic characteristics

Each sample, slitted into a ½ in.-wide tape, was passed through a magnetic tape recorder-reproducer manufactured and marketed by Honeywell Co. under the trade designation of "Model 96". Its S/N ratio during the run at the speed of 30 ips, recording frequency of 370 kHz, and input voltage of 5.5 V, was measured.

TABLE 2

| Example | Squareness ratio | Surface roughness (μm) | Adhesion (g) | Durability | | Gloss | | S/N ratio (dB) |
| --- | --- | --- | --- | --- | --- | --- | --- | --- |
| | | | | Initial | After storage | When dispersed (%) | After processing (%) | |
| 1 | 0.81 | 0.014 | 220 | A | B | 98 | 155 | 41.2 |
| 2 | 0.82 | 0.013 | 250 | A | A | 96 | 160 | 41.5 |
| 3 | 0.81 | 0.015 | 240 | B | B | 92 | 155 | 41.0 |
| 4 | 0.82 | 0.014 | 250 | B | B | 95 | 158 | 41.2 |
| 5 | 0.81 | 0.014 | 240 | B | B | 93 | 155 | 41.1 |
| 6 | 0.81 | 0.014 | 240 | B | B | 93 | 156 | 41.0 |
| 7 | 0.80 | 0.014 | 240 | B | B | 92 | 155 | 41.0 |
| Comp. 1 | 0.70 | 0.022 | 230 | B | B | 74 | 128 | 37.2 |

TABLE 2-continued

| Example | Squareness ratio | Surface roughness (μm) | Adhesion (g) | Durability | | Gloss | | S/N ratio (dB) |
| --- | --- | --- | --- | --- | --- | --- | --- | --- |
| | | | | Initial | After storage | When dispersed (%) | After processing (%) | |
| 2 | 0.68 | 0.024 | 200 | B | C | 69 | 119 | 34.5 |
| 3 | 0.78 | 0.015 | 240 | C | D | 92 | 153 | 40.8 |
| 4 | 0.80 | 0.014 | 250 | D | D | 94 | 158 | 41.0 |

Table 2 clearly shows that the samples embodying the invention were superior in dispersibility, output, and durability.

Samples of Comparative Examples 1 and 2, which used the COOH group instead of the tertiary amine, exhibited inadequate gloss and dispersibility, hence low S/N ratio. In Comparative Example 3, the $SO_3Na$ group that is often used to enhance dispersibility was employed, but the durability was low. Comparative Example 4 used ethylene glycol as the chain extender, but again the durability was inferior. According to the present invention, by contrast, both durability and S/N ratio were improved.

What is claimed is:

1. A magnetic recording medium comprising a base film and a magnetic layer formed thereon which in turn comprises a magnetic powder and a binder, said binder containing a polyurethane resin which consists of a reaction product of (A) a polyester which is a reaction product of a diol selected from among ethylene glycol, propylene glycol, 1,3-butanediol, 1,4-butanediol, 1,5-pentadiol, and 1,6-hexanediol, and adipic acid, (B) a chain extender consisting of 1,4-cyclohexanedimethanol, (C) an aliphatic or aromatic diisocyanate in an amount substantially equal to the combined molar amount of the polyester and the chain extender, and (D) a tertiary amine.

2. A magnetic recording medium according to claim 1 wherein said magnetic powder is a powder of $CrO_2$.

3. A method of manufacturing a magnetic recording medium which comprises mixing a magnetic powder with and dispersing the same in a polyurethane-base binder which consists of a reaction product of (A) a polyester which is a reaction product of a diol selected from among ethylene glycol, propylene glycol, 1,3-butanediol, 1,4-butanediol, 1,5-pentadiol, and 1,6-hexanediol, and adipic acid, (B) a chain extender consisting of 1,4-cyclohexanedimethanol, (C) an aliphatic or aromatic diisocyanate in an amount substantially equal to the combined molar amount of the polyester and the chain extender, and (D) a tertiary amine, and applying the resulting magnetic coating material to a base film.

4. The method of manufacturing a magnetic recording medium according to claim 3 wherein said magnetic powder is a powder of $CrO_2$.

* * * * *